(12) United States Patent
Schler

(10) Patent No.: US 11,536,079 B2
(45) Date of Patent: Dec. 27, 2022

(54) SECURE PACKAGE DELIVERY SYSTEM AND ASSOCIATED METHODS

(71) Applicant: Andrew M. Schler, Satellite Beach, FL (US)

(72) Inventor: Andrew M. Schler, Satellite Beach, FL (US)

(*) Notice: Subject to any disclaimer, the term of this patent is extended or adjusted under 35 U.S.C. 154(b) by 146 days.

(21) Appl. No.: 17/096,608

(22) Filed: Nov. 12, 2020

(65) Prior Publication Data

US 2021/0230926 A1 Jul. 29, 2021

Related U.S. Application Data

(60) Provisional application No. 62/966,819, filed on Jan. 28, 2020.

(51) Int. Cl.
*G08B 13/08* (2006.01)
*E05F 15/73* (2015.01)
*E05F 15/77* (2015.01)

(52) U.S. Cl.
CPC .............. *E05F 15/73* (2015.01); *E05F 15/77* (2015.01); *E05Y 2201/434* (2013.01); *E05Y 2201/684* (2013.01); *E05Y 2400/32* (2013.01); *E05Y 2400/40* (2013.01); *E05Y 2400/44* (2013.01); *E05Y 2400/664* (2013.01); *E05Y 2400/85* (2013.01); *E05Y 2800/71* (2013.01); *E05Y 2900/131* (2013.01)

(58) Field of Classification Search
CPC .... E05F 15/73; E05F 15/77; E05Y 2201/434; E05Y 2201/684; E05Y 2400/32; E05Y 2400/40; E05Y 2400/44; E05Y 2400/664; E05Y 2400/85; E05Y 2800/71; E05Y 2900/131; A47G 29/20; A47G 29/22; A47G 29/124; A47G 2029/144; A47G 2029/1257; A47G 29/12095; A47G 29/141; A47G 29/1248; A47G 2029/149; A47G 2029/145; H04N 7/183; G07F 17/00; G07C 9/00571; G07C 9/00896; G06Q 50/28
USPC ........ 49/14, 25, 504, 70, 475, 381, 349, 506
See application file for complete search history.

(56) References Cited

U.S. PATENT DOCUMENTS

| | | | |
|---|---|---|---|
| 6,477,442 B1 * | 11/2002 | Valerino, Sr. ......... | B65G 51/34 414/730 |
| 10,743,693 B2 * | 8/2020 | Newcomb ............... | G07C 9/00 |
| 10,913,160 B2 * | 2/2021 | Deyle ..................... | B25J 5/007 |

(Continued)

*Primary Examiner* — Chi Q Nguyen
(74) *Attorney, Agent, or Firm* — Mark Malek; Jonathan Staudt; Widerman Malek, PL

(57) ABSTRACT

A package delivery system includes a door access panel that is moveable between an open position and a closed position, and a frame configured to be carried by a door adjacent a passageway and configured to movably mount the door access panel. The system includes an actuator, a motor, and a controller to control selective actuation of the door access panel. The system also includes a wireless communication interface to communicatively couple the controller and a smart device for receiving a remote input to actuate the door access panel between the closed and opened positions. The system further includes a user interface configured to receive local input for actuation of the door access panel. A sensing unit is also included and has a position sensor to generate position signals to the controller. A scanning unit is coupled to the controller to scan packages delivered through the passageway.

20 Claims, 2 Drawing Sheets

(56) References Cited

U.S. PATENT DOCUMENTS

| | | |
|---|---|---|
| 10,954,067 B1* | 3/2021 | Theobald ............... B25J 19/022 |
| 11,346,150 B1* | 5/2022 | Johnston ............... A47G 29/141 |
| 2003/0006275 A1* | 1/2003 | Gray ...................... A47G 29/14 |
| | | 232/19 |
| 2003/0125836 A1* | 7/2003 | Chirnomas ............... G07F 9/02 |
| | | 700/236 |
| 2014/0190081 A1* | 7/2014 | Wanjohi ............... A47G 29/126 |
| | | 49/504 |
| 2015/0120529 A1* | 4/2015 | Faaborg ............... G06Q 10/083 |
| | | 705/330 |
| 2016/0247344 A1* | 8/2016 | Eichenblatt ........ G07C 9/00896 |
| 2019/0180544 A1* | 6/2019 | Newcomb .......... G07C 9/00896 |
| 2021/0038004 A1* | 2/2021 | Graña ....................... E06B 7/32 |
| 2022/0031105 A1* | 2/2022 | Newcomb .......... G07C 9/00896 |

* cited by examiner

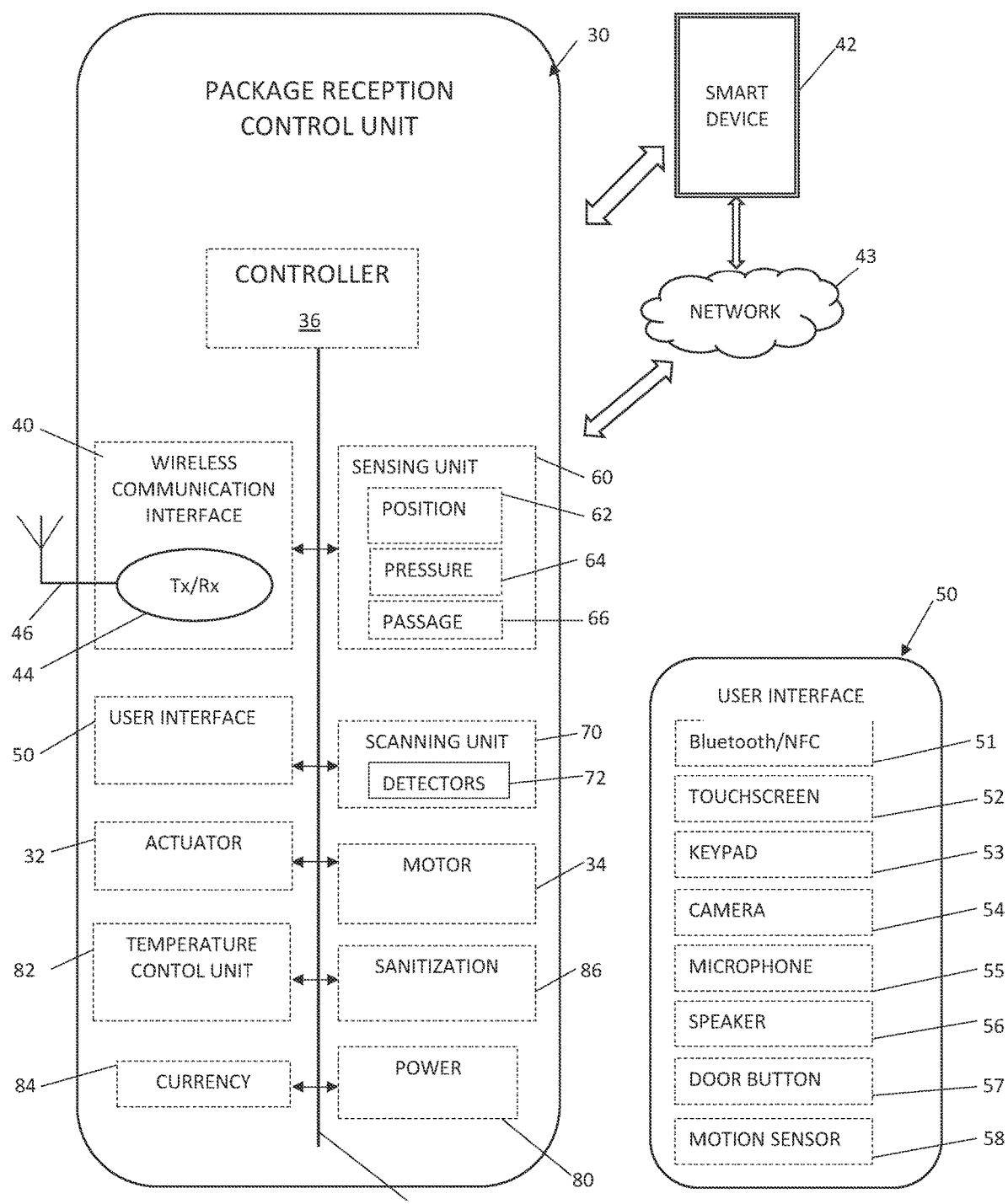

SECURE PACKAGE DELIVERY SYSTEM AND ASSOCIATED METHODS

RELATED APPLICATIONS

This application claims priority under 35 U.S.C. § 119(e) of U.S. Provisional Patent Application Ser. No. 62/966,816 filed on Jan. 28, 2020 and titled Secure Package Delivery System and Associated Methods. The content of this application is incorporated herein by reference.

FIELD OF THE INVENTION

The present invention relates to systems and methods for receiving package deliveries.

BACKGROUND OF THE INVENTION

Online shopping has resulted in more packages being delivered to homes and businesses. Packages may be delivered when the recipient is not present. The contents of the package may be valuable and/or important. Such packages delivered on a doorstep or other location outside of a residence are exposed to theft and/or damage from weather. Valuable packages may require a signature for security or require insurance against loss or theft. Such a signature requirement may complicate or delay the delivery when the recipient is unavailable to receive the shipment from the deliverer, which may result in additional costs.

Various approaches for securing delivered packages exist. For example, U.S. Pat. No. 10,653,262 to Israel is titled "Parcel securing assembly" and is directed to a parcel securing assembly that includes a box that is positionable on a horizontal support surface proximate an entrance to a building. The box has a delivery opening therein for receiving a delivered parcel. A door is hingedly coupled to the box and the door is aligned with the delivery opening for opening and closing the delivery opening. A locking unit is coupled to the box, and the locking unit is operationally coupled to the door. The locking unit is urgeable into a locked condition when the door is opened such that the locking unit locks the door when the door is subsequently closed. In this way the locking unit secures the delivered parcel in the box until an authorized user unlocks the locking unit.

U.S. Pat. No. 9,619,955 to Eichenblatt is titled "Systems and methods for facilitating package delivery or pickup" and is directed to a system for facilitating package delivery or pickup at premises of senders or recipients having a package door that is used for receipt and collection of packages. The package door includes an input device for entering package information and an image capture device for visually recording the arrival of a courier. The system may automatically unlock the package door if the package information matches a predetermined value. A user may remotely monitor the package information and/or information from the image capture device to determine whether to provide inputs for unlocking the package door.

Current package delivery approaches may be inconvenient and/or unreliable. Accordingly, there is a need for an improved package delivery experience.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to systems, devices and methods for securely receiving a delivery at a residence or commercial location, for example.

Objects, features and advantages of the present invention may be provided by an embodiment directed to a package delivery system. The system includes a door access panel configured as a wicket to provide selective access to a passageway adjacent to, or within, an entry door, and being moveable between an open position and a closed position, and a frame configured to be carried by the door adjacent the passageway, and configured to movably mount the door access panel. An actuator is coupled to the door access panel, and a motor is coupled to the actuator and configured to impart motion to the door access panel via the actuator. A controller is coupled to the motor and configured to control selective actuation of the door access panel via the motor and actuator. A wireless communication interface is coupled to the controller and configured to communicatively couple the controller and a smart device of an authorized user for receiving a remote input to actuate, via the motor and actuator, the door access panel to move between the closed position and the open position. A user interface is coupled to the controller and configured to receive local input for actuation of the door access panel to move between the closed position and the open position. A sensing unit is coupled to the controller and includes a position sensor configured to generate position signals to the controller with respect to the position of the door access panel. A scanning unit is coupled to the controller and includes detectors configured to scan packages delivered through the passageway for determining package parameters including at least one of package contents, dimensions, quantities, temperature, warnings, and sender information. A power source is configured to provide power to the controller and the motor.

Additionally, and/or alternatively, the frame includes at least one of rails, tracks and guides to provide slidable movement of the door access panel between the closed position and the open position.

Additionally, and/or alternatively, the actuator includes at least one of a gear, chain, cable, screw, lever and belt to transfer motive power between the motor and the door access panel to variably move the door access panel between the open position and the closed position.

Additionally, and/or alternatively, the wireless communication interface includes a transceiver and an antenna configured to communicatively couple the controller to a smart device and/or a local network.

Additionally, and/or alternatively, a temperature control unit is coupled to the controller, positioned adjacent the door access panel, and configured to control the temperature of a delivered package.

Additionally, and/or alternatively, a currency handler is coupled to the controller, positioned adjacent the door access panel, and configured to accept/dispense currency related to a delivery.

Additionally, and/or alternatively, a sanitization unit is coupled to the controller, positioned adjacent the door access panel, and configured to sanitize a delivered package.

Additionally, and/or alternatively, the user interface may include a Bluetooth communication device, a near-field communication (NFC) device, a touchscreen, and/or a keypad to receive an authorization code as the local input for actuation of the door access panel to move between the closed position and the open position.

Additionally, and/or alternatively, the user interface may include a camera, microphone and speaker configured for visual and audio communication between a local deliverer at the door and the smart device of the authorized user. The user interface may also include a door button, keypad and/or a motion sensor configured to confirm the presence of the local deliverer at the door.

Additionally, and/or alternatively, the sensing unit, coupled to the controller, further includes a pressure sensor configured to generate pressure signals to the controller with respect to a closing force of the door access panel to aid in capture of an unauthorized intruder within the passageway.

Additionally, and/or alternatively, the sensing unit, coupled to the controller, further includes a passageway sensor configured to generate passage signals to the controller with respect to a passage of an object through the passageway while the door access panel is in the open position.

Objects, features and advantages of the present invention may be provided by another embodiment directed to a package delivery door system. The system includes a door access panel configured as a wicket to provide selective access to a passageway adjacent to, or within, an entry door, and being moveable between an open position and a closed position. An actuator is coupled to the door access panel, and a motor is coupled to the actuator and configured to impart motion to the door access panel via the actuator, A controller is coupled to the motor and configured to control selective actuation of the door access panel via the motor and actuator. A wireless communication interface is coupled to the controller and configured to communicatively couple the controller and a smart device of an authorized user for receiving a remote input to actuate, via the motor and actuator, the door access panel to move between the closed position and the open position. A user interface is coupled to the controller and configured to receive local input for actuation of the door access panel to move between the closed position and the open position. A sensing unit is coupled to the controller and includes a position sensor configured to generate position signals to the controller with respect to the position of the door access panel. A power source is configured to provide power to the controller and the motor.

Additionally, and/or alternatively, a scanning unit is coupled to the controller and includes detectors configured to scan packages delivered through the passageway for determining package parameters including at least one of package contents, dimensions, quantities, temperature, warnings, and sender information.

Additionally, and/or alternatively, the actuator includes a gear, chain, cable, screw, lever and/or belt to transfer motive power between the motor and the door access panel to variably move the door access panel between the open position and the closed position.

Additionally, and/or alternatively, the wireless communication interface includes a transceiver and an antenna configured to communicatively couple the controller to at least one of the smart device and a local network.

Additionally, and/or alternatively, the user interface includes a Bluetooth communication device, a near-field communication (NEC) device, a touchscreen, and/or a keypad to receive an authorization code as the local input for actuation of the door access panel to move between the closed position and the open position.

Additionally, and/or alternatively, the user interface includes a camera, microphone and/or speaker configured for visual and audio communication between a local deliverer at the door and the smart device of the authorized user.

The user interface may also include a door button, keypad and/or a motion sensor configured to confirm the presence of the local deliverer at the door.

Additionally, and/or alternatively, the sensing unit, coupled to the controller, may include a pressure sensor configured to generate pressure signals to the controller with respect to a closing force of the door access panel.

Additionally, and/or alternatively, the sensing unit, coupled to the controller, may include a passageway sensor configured to generate passage signals to the controller with respect to a passage of an object through the passageway while the door access panel is in the open position.

BRIEF DESCRIPTION OF THE DRAWINGS

FIG. 2 is a schematic block diagram illustrating further details of a control unit of the package delivery system of FIG. 1.

FIG. 3 is a schematic block diagram illustrating further details of a user interface of the control unit for the package delivery system of FIG. 1

DETAILED DESCRIPTION OF THE INVENTION

Figure 1:
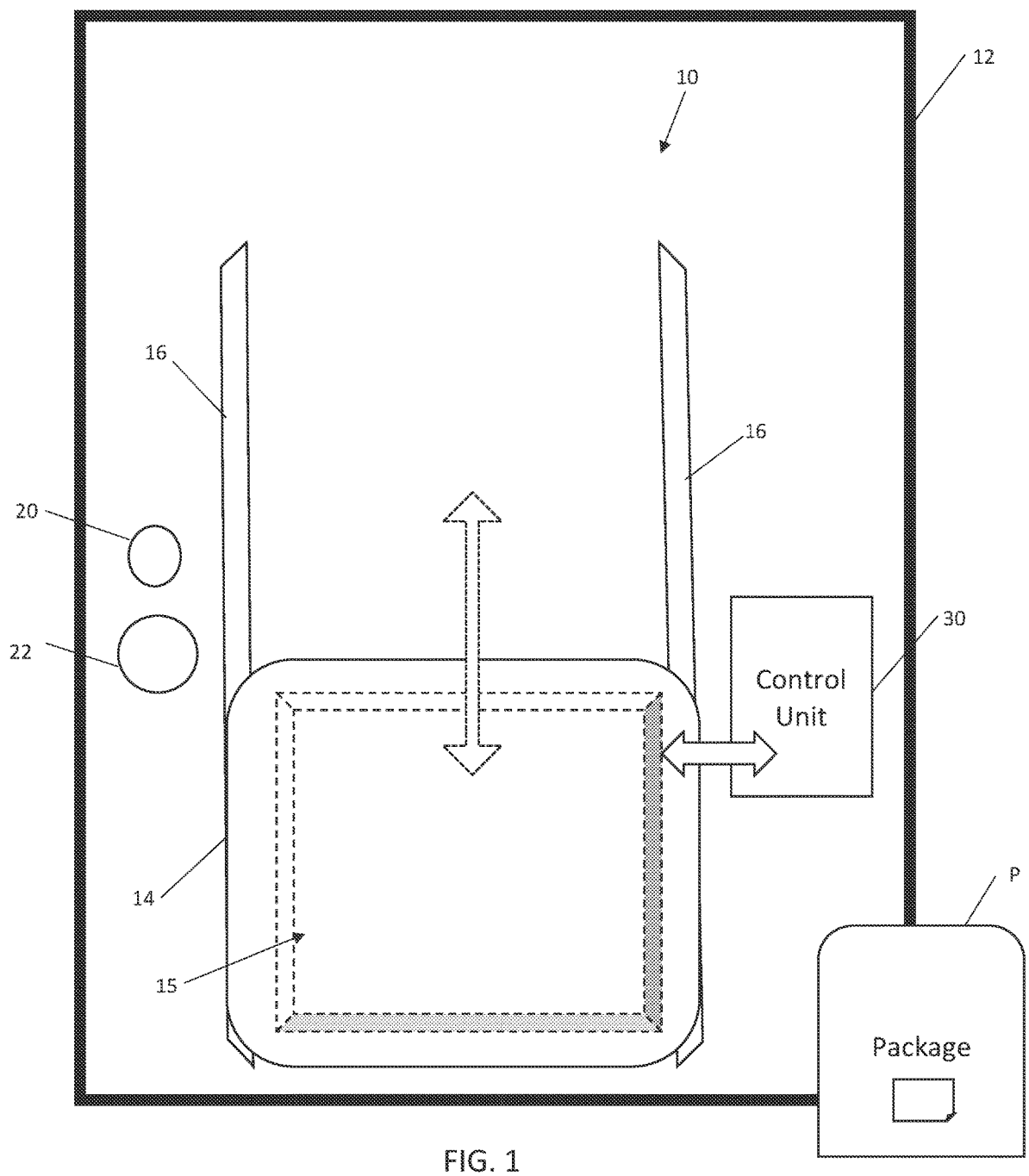
FIG. 1 is a schematic diagram showing a package delivery system according to an embodiment of the present invention and installed as a wicket in a typical entry door.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to Ike elements throughout.

Before describing the present disclosure in detail, it is to be understood that this disclosure is not limited to parameters of the particularly exemplified systems, methods, apparatus, products, processes, and/or kits, which may, of course, vary. It is also to be understood that the terminology used herein is only for the purpose of describing particular embodiments of the present disclosure, and is not necessarily intended to limit the scope of the disclosure in any particular manner. Thus, while the present disclosure will be described in detail with reference to specific embodiments, features, aspects, configurations, etc., the descriptions are illustrative and are not to be construed as limiting the scope of the claimed invention. Various modifications can be made to the illustrated embodiments, features, aspects, configurations, etc. without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While a number of methods and materials similar or equivalent to those described herein can be used in the practice of the present disclosure, only certain exemplary materials and methods are described herein.

Various aspects of the present disclosure, including devices, systems, methods, etc., may be illustrated with reference to one or more exemplary embodiments or implementations. As used herein, the terms "embodiment," "alternative embodiment" and/or "exemplary implementation" means "serving as an example, instance, or illustration," and should not necessarily be construed as preferred or advantageous over other embodiments or implementations disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an" and "the" include plural referents unless the content clearly dictates otherwise. Thus, for example, reference to a "sensor" includes one, two, or more sensors.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct connection between two components or, where appropriate, an indirect connection to one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another. For instance, coupling, attaching, connecting, and/or joining can comprise placing, positioning, and/or disposing the components together or otherwise adjacent in some implementations.

As used herein, directional and/or arbitrary terms, such as "top," "bottom," "front," "back," "left," "right," "up," "down," "upper," "lower," "inner," "outer," "internal," "external," "interior," "exterior," "proximal," "distal" and the like can be used solely to indicate relative directions and/or orientations and may not otherwise be intended to limit the scope of the disclosure, including the specification, invention, and/or claims.

Where possible, like numbering of elements have been used in various figures. In addition, similar elements and/or elements having similar functions may be designated by similar numbering. Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein.

It is also noted that systems, methods, apparatus, devices, products, processes, compositions, and/or kits, etc., according to certain embodiments of the present invention may include, incorporate, or otherwise comprise properties, features, aspects, steps, components, members, and/or elements described in other embodiments disclosed and/or described herein. Thus, reference to a specific feature, aspect, steps, component, member, element, etc. in relation to one embodiment should not be construed as being limited to applications only within said embodiment. In addition, reference to a specific benefit, advantage, problem, solution, method of use, etc. in relation to one embodiment should not be construed as being limited to applications only within said embodiment.

The headings used herein are for organizational purposes only and are not meant to be used to limit the scope of the description or the claims. To facilitate understanding, like reference numerals have been used, where possible, to designate like elements common to the figures.

With reference to FIGS. 1-3, an embodiment of the invention, as shown and described by the various figures and accompanying text, provides a package delivery system 10 that can be used to receive packages at a residence or commercial property. The package delivery system 10 according to the present invention advantageously allows for packages to be delivered to a home or a place of business so that the package can be securely received and prevents the ever-increasing problem of packages being stolen from outside a door after delivery, i.e., "porch pirates."

As illustrated in FIGS. 1-3, the package delivery system 10 according to the present invention can be provided in any number of embodiments. For example, the package delivery system 10 can be provided within a door 12 having a delivery or door access panel 14 and passageway 15 installed therein. The present invention also contemplates embodiments of that provide a package delivery system 10 as a kit so that an existing door can be retrofitted to include the delivery panel 14 and other components. The panel 14 and passageway 15 may also be installed adjacent to the door 12, for example, in a wall.

The system 10 may include the door access panel 14 configured as a wicket to provide selective access to passageway 15 adjacent to, or within, the entry door 12, and being moveable between an open position and a closed position. A frame 16 is configured to be carried by the door 12 adjacent the passageway 15 and configured to movably mount the door access panel 14. The frame 16 may include at least one of rails, tracks and guides to provide slidable movement of the door access panel between the closed position and the open position.

A control unit 30 is associated with the panel 14 to control and operate the system 10, The control unit 30 includes an actuator 32 that is coupled to the door access panel 14, and a motor 34 that is coupled to the actuator 32 and configured to impart motion to the door access panel 14 via the actuator 32. The actuator 32 may include a gear, chain, cable, screw, lever and/or belt to transfer motive power between the motor 34 and the door access panel 14 to variably move the door access panel 14 between the open position and the closed position. A controller 36 is coupled to the motor 34 and configured to control selective actuation of the door access panel 14 via the motor 34 and actuator 32.

A wireless communication interface (WCI) 40 may be coupled to the controller 36 and configured to communicatively couple the controller 36 to a computer and/or smart device 42 of an authorized user for receiving a remote input to actuate, via the motor 34 and actuator 32, the door access panel 14 to move between the closed position and the open position. The wireless communication interface 40 may include a transceiver 44 and an antenna 46 configured to communicatively couple the control unit 30 to the smart device 42 and/or a local network 43 (e.g. WLAN, satellite or cellular network).

A user interface 50 may be coupled to the controller 36 and configured to receive local input for actuation of the door access panel 14 to move between the closed position and the open position. A sensing unit 60 may be coupled to the controller 36 and includes a position sensor 62 configured to generate position signals to the controller 36 with respect to the position of the door access panel 14. The sensing unit 60 may further include a pressure sensor 64 configured to generate pressure signals to the controller 36 with respect to a closing force of the door access panel 14 to aid in capture of an unauthorized intruder within the passageway 15. The sensing unit 60 may further include a passageway sensor 66 configured to generate passage signals to the controller 36 with respect to a passage of an object (e.g. the package P) through the passageway 15 while the door access panel 14 is in the open position.

A scanning unit 70 may be coupled to the controller 36 and includes detectors 72 configured to scan packages delivered through the passageway 15 for determining package parameters including package contents, dimensions, quantities, temperature, warnings, and/or sender information. A power source 80 is configured to provide power to the controller 36, motor 34 and all other powered components. The power source 80 may be wired to a property electrical system or may be battery powered as would be appreciated by those skilled in the art.

Additional features may include a temperature control unit 82 that is coupled to the controller 36 and configured to control the temperature of a delivered package P. A currency handler 84 may be coupled to the controller 36, positioned adjacent the door access panel 14, and configured to accept/dispense currency related to a delivery. Also, a sanitization unit 86 may be coupled to the controller 36, positioned adjacent the door access panel 14, and configured to sanitize a delivered package P. The controller 36 may be coupled to the other components within the control unit 30 via various channels, for example, including a communication bus 88.

FIG. 3 is a schematic block diagram illustrating further details of the user interface 50 of the control unit 30 for the package delivery system 10 of FIG. 1. The user interface 50 may include a Bluetooth communication device 51 (and/or a near-field communication (NFC) device), a touchscreen or display 52, and/or a keypad 53 to receive an authorization code as the local input for actuation of the door access panel 14 to move between the closed position and the open position. The user interface 50 may include a camera 54, microphone 55 and speaker 56 configured for visual and audio communication between a local deliverer at the door 12 and the smart device 42 of the authorized user. The user interface 50 may also include a door button 57, the keypad 53 and/or a motion sensor 58 configured to confirm the presence of the local deliverer at the door 12.

Thus, in an embodiment of the package delivery system 10 wherein a door 12 is being retrofitted with a delivery panel 14, a passageway 15 may first be cut into an existing door. The passageway 15 would be positioned so as not to interfere with a traditional deadbolt lock 20 and door knob 22 of the door 12. After the passageway 15 is cut, the frame 16, to carry the delivery panel 14, is installed in the door 12. Similar to the passageway 15, the frame 16 is installed on the door 12 also so as not to interfere with the door knob 22 and deadbolt lock 20 of the door. The frame 16 may be formed of metal, wood or synthetic materials, for example, and may be provided by angle iron, or any other type of material suitable for providing a frame that the delivery panel 14 may moveably engage. More specifically, the delivery panel 14 is moveable between an open position and a closed position. When in the open position, the delivery panel 14 may slide within the frame 16 so that access through the door 12 may be provided to allow for delivery of the package P within the residence or business. When in a closed position, the delivery panel 14 may slide within the frame 16 so that the passageway 15 in the door 12 is sealed and access to the property is secured.

The package delivery system 10 according to the present invention may include the motor 34 that is in communication with the moveable delivery panel 14. The motor 34 may, for example, be connected to a chain, other rope, or gear that may be connected between an actuator 32 and a portion of the panel 14. When the motor 34 is activated, the moveable delivery panel 14 may be moved between the open and the closed positions. The motor 34 is in communication with the controller 36 that is associated or embedded in the door 12 as part of the package delivery door system 10 according to embodiments of the present invention. The controller 36 and the motor 34 may be connected to a power source 30 that may also be carried by the door 12. It is contemplated that the controller 36 is also connectable to a wireless network so that signals may be transmitted from the controller 36 to a receiving device such as, for example, on the smart device 42 with a mobile application installed so that an authorized user may remotely connect to the controller 36 and may monitor and control the package delivery door system 10 of the present invention.

The package delivery door system 10 according to the present invention may also include the user interface 50 connected to the controller 36 and the power source 80. The user interface 50 may, for example, be provided by the touchscreen 52 or digital keypad 53 that allows for the motor 34 to be activated by entry of a unique code. The unique code, once entered, may allow for a signal to be sent from the user interface 50 to the motor 34 so that the motor 34 may be activated to move the delivery panel 14 to the opened position. Those skilled in the art will appreciate that the unique code that may be entered into the user interface 50 may be readily changeable. For example, the unique code may be changeable by the owner of the dwelling where the package is to be delivered or may be a idling unique code that changes every predetermined period of time. In the case of a rolling code generation, the system 10 would also include a rolling code generator to provide a user with the unique code that is generated every predetermined period of time. Further, a delivery driver may also have access to the unique code generator or can be provided access to the unique code that is generated on the unique code generator by transmitting an alert to the owner of the dwelling that a package P is ready to be delivered.

The user interface 50 may also allow for activation of the motor 34 upon receipt of a signal. The signal may be provided, for example, by an access card that can be activated upon moving within a predetermined distance of the user interface 50. As such, the Bluetooth or near field communication device 51 may communicate with a delivery driver that has an NFC capability which is included on many mobile devices, so that the delivery driver may transmit a signal from the mobile device 42 that activates the motor 34 to move the panel 14 from the closed position to the open position. Other signal transmitters are also contemplated by the present invention that are suitable for transmitting a signal to the user interface 50 so that the delivery panel 14 can be moved between the closed position and the opened position.

As discussed, the package delivery system 10 according to the present invention may also include the camera 54 connected to the controller 36 and the power source 80. The camera 54 may, for example, include the passageway sensor 66 that senses movement in a vicinity of the door 12 and may activate to capture images or video of that which may be in front of the door 12 within the vicinity. Upon being activated, it is contemplated that the image or video may be sent to an authorized user. It is also contemplated that the camera 54 may also activate a microphone 55 to capture audio within the vicinity when the camera is activated. Further, it is contemplated that a speaker 56 may be included in the package delivery door system 10 so that a user may transmit audio.

The camera 54 can be used to identify a delivery person and provide them access to deliver a package P through the moving panel 14. For example, when a person is within a defined vicinity of the camera 54, the motion sensor 58 may activate the camera 54 and automatically transmit captured images or video (via the controller 36) to the authorized user. The user may then transmit audio that can be heard by the delivery person to make inquiries regarding the package P. Upon being satisfied that the person within the defined vicinity is there to legitimately deliver a package, the authorized user may transmit a signal to the controller 36 which will activate the motor 34 to move the delivery panel 14 from the closed position to the opened position.

The camera 54 may also be used to provide the authorized user with notice that someone is accessing the premises through the delivery panel 14 that is not authorized to do so. For example, in a scenario where the delivery panel 14 was left in an open position, and it is determined that a person that is not authorized to access the premises is doing so through the passageway 15, the system 10 can include an emergency mode that will lower the delivery panel 14 and engage the unauthorized person.

It is contemplated that the system 10 will also include the pressure sensor 64 that is in communication with the controller 36 and that can lower the panel 14 to a predefined pressure. It is preferable that the predefined pressure is one that would restrain the unauthorized person, but not cause bodily harm to the unauthorized person. Further, the system 10 could be configured to automatically contact crime prevention authorities, e.g., police, should the emergency mode be activated by the authorized user, a signal would also be transmitted to local authorities to respond to the premises.

After the delivery person has passed the package P through the passageway 15 when the delivery panel 14 is in the opened position, the delivery panel 14 may automatically, via the controller 36, move to the closed position after a defined period of time that may be set by a user or that may be predefined. Alternatively, after identifying that the motion at the door 12 is from a delivery person, the authorized user may either provide a unique code to the delivery person that the delivery person can enter into the keypad 53 to move the delivery panel 14 between the closed position and the opened position. It is also contemplated that the package delivery system 10 may also include an option to close the panel upon completion of the delivery, i.e., the button 57 of the user interface 50 that is in communication with the controller 36 so that when the delivery person activates the button 57, the delivery panel 14 can be moved from the open position to the closed position.

It is also contemplated that the package delivery system 10 may include the position sensor 62 that informs an authorized user of the position of the delivery panel 14. The position sensor 62 may be carried by the frame 16 so that the position of the delivery panel 14 can be determined and a signal may be transmitted using the controller 36 to the authorized user via the WCI 40 and the smart device 42. The passageway sensor 66 may be carried by the frame 16 and may be used to sense when a package P has been passed through the passageway 15 exposed by the open delivery panel 14 and, upon sensing that the package P has passed through the passageway 15, can automatically close the delivery panel 14 via the controller 36. It is further contemplated that the authorized user may simply send a signal from a connected smart device 42 to the controller 36 to move the delivery panel 14 between the closed position and the open position.

It is contemplated that the present invention may also be provided as a complete door that can simply be installed by a user where an existing door frame is located. For example, the complete door would include the package delivery system 10 installed therein, and all the above referenced components are already installed in the door. After the door is installed, the user can readily connect a smart device 42 to the system 10, for example, using a downloaded mobile application, or "app", so that the user can be defined as an authorized user and control the door as needed. Further, it is contemplated that the door and the package delivery door system 10 according to the present invention can be readily connected to a wireless network of a dwelling or place of business so that, via the wireless network, the user's smart device 42 can be used to readily communicate with the package delivery system 10.

A communication network operates in accordance with embodiments of the present disclosure. In particular, a data server communicates with client devices such as mobile terminal and personal computer via network. The network can include a single network or a plurality of different networks. These network(s) can include the Internet, a private communication network, a local area network, a mobile wireless communication network, a wired or fiber optic network or other broadband communication network.

The data server can present a website that operates via a browser application of mobile terminal and/or personal computer or that otherwise provides a server application that operates in conjunction with a client device having an application such as a mobile application selected for download by the user and downloaded to the client device to present and gather data that includes user data and preferences, and other data.

A computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

The controller 36, or processing module, can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory. The memory can include a hard disc drive or other disc drive, read-only memory, random access memory, volatile memory, non-volatile memory, static memory, dynamic memory, flash memory, cache memory, and/or any device that stores digital information. Note that when a processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus, other architectures are possible including additional data buses and/or direct connectivity between one or more elements.

At least one processor of the processing module executes the data server application to bidirectionally communicate data with a user of a client device 42, such as client device via the network interface and the network 43.

The client device 42, such as mobile terminal, personal computer or other client device such as a personal digital assistant, e-reader, tablet, or smartphone is presented. The client device includes a network interface having one or more interfaces that include wireless interfaces such as a 3G, 4G or other wireless telephony transceiver, a Bluetooth transceiver, a WiFi transceiver, UltraWideBand transceiver, WIMAX transceiver, ZigBee transceiver or other wireless interface. Examples of interfaces further include wired interfaces such as a Universal Serial Bus (USB) interface, an IEEE 1394 Firewire interface, an Ethernet interface or other network card or modem for communicating with data server, or other servers such as content servers via the network 43. The client device also includes a user interface such as a display device, touch screen, key pad, touch pad, thumb wheel, one or more buttons, a speaker, a microphone, an accelerometer, gyroscope or other motion or position sensor, or other interface devices that provide information to a user of the client device and that generate data in response to the user's interaction with the client device. In addition, the client device includes an image capture device such as a digital camera that captures still or video images with or without associated audio.

The client device 42 also includes a processing module and memory module that stores an operating system such as a Linux-based operating system, a Microsoft personal computer or mobile operating system, an Android operating system, an Apple mobile or personal computer operating system or other operating system. The memory module also stores location data corresponding to the location of the client device generated via user interaction with user interface, via optional Global Positioning System (GPS) receiver, one or more motion sensors such as accelerometers, gyroscopes or other sensors, or gathered via a wireless network such as triangulation data received from a 4G network, for example, location information from a connected access point or base station, femtocell or other location data. In addition, memory module includes a messaging application for communicating with other client devices such as an email application, a text, instant messaging or short messaging service (SMS) application or other messaging application that stored contacts data corresponding to users of other client devices that are known to the user of client device as well as contact information corresponding to message recipients.

The memory module also stores a data client application that is prestored in the memory module, loaded via disk or downloaded to the memory module via network interface. The delivery data client application can be a general browser application such as Mozilla, Google Chrome, Safari, Internet Explorer or other general web browser or an application that is customized to operate in conjunction with delivery data server in conjunction with the exchange of delivery data.

The user device, network server, system, mobile device and other components may be part of, and/or communicate with, a network that may provide automated control of devices, appliances and other home systems (such as security systems, lighting systems, wired/wireless communication systems etc.), and may include the use of Internet of Things (IoT) technology, various input/output interfaces, Internet connectivity, and/or remote control capabilities etc., for example.

The user device, network server, system, mobile device and other components may be implemented by one or more processors or computers. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The above description provides specific details, such as material types and processing conditions to provide a thorough description of example embodiments. However, a person of ordinary skill in the art would understand that the embodiments may be practiced without using these specific details.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims.

Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. Thus, the scope of the invention should be determined by the appended claims and their legal equivalents, and not by the examples given.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the description of the invention. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

The invention claimed is:

1. A package delivery system comprising:
   a door access panel configured as a wicket to provide selective access to a passageway adjacent to, or within, an entry door, and being moveable between an open position and a closed position;
   a frame configured to be carried by the entry door adjacent the passageway, and configured to movably mount the door access panel;
   an actuator coupled to the door access panel;
   a motor coupled to the actuator and configured to impart motion to the door access panel via the actuator;
   a controller, coupled to the motor, and configured to control selective actuation of the door access panel via the motor and actuator;
   a wireless communication interface, coupled to the controller, and configured to communicatively couple the controller and a smart device of an authorized user for receiving a remote input to actuate, via the motor and actuator, the door access panel to move between the closed position and the open position;
   a user interface, coupled to the controller, and configured to receive local input for actuation of the door access panel to move between the closed position and the open position;
   a sensing unit, coupled to the controller, and including a door access panel position sensor configured to monitor the position of the door access panel and transmit position signals to the smart device of an authorized user regarding the position of the door access panel via the wireless communication interface;
   a scanning unit, coupled to the controller, and including package parameter detectors that are configured to determine package parameters of packages delivered through the passageway including at least one of package contents, dimensions, quantities, temperature, warnings, and sender information; and a power source configured to provide power to the controller and the motor.

2. The package delivery system according to claim 1, wherein the frame comprises at least one of rails, tracks and guides to provide slidable movement of the door access panel between the closed position and the open position.

3. The package delivery system according to claim 1, wherein the actuator comprises at least one of a gear, chain, cable, screw, lever and belt to transfer motive power between the motor and the door access panel to variably move the door access panel between the open position and the closed position.

4. The package delivery system according to claim 1, wherein the wireless communication interface comprises a transceiver and an antenna configured to communicatively couple the controller to at least one of the smart device and a local network.

5. The package delivery system according to claim 1, further comprising a temperature control unit, coupled to the controller, positioned adjacent the door access panel, and configured to control the temperature of a delivered package.

6. The package delivery system according to claim 1, further comprising a currency handler, coupled to the controller, positioned adjacent the door access panel, and configured to at least one of accept and dispense currency related to a delivery.

7. The package delivery system according to claim 1, further comprising a sanitization unit, coupled to the controller, positioned adjacent the door access panel, and configured to sanitize a delivered package.

8. The package delivery system according to claim 1, wherein the user interface comprises at least one of a Bluetooth communication device, a near-field communication (NFC) device, a touchscreen, and a keypad to receive an authorization code as the local input for actuation of the door access panel to move between the closed position and the open position.

9. The package delivery system according to claim 1, wherein the user interface comprises a camera, microphone and speaker configured for visual and audio communication between a local deliverer at the door and the smart device of the authorized user.

10. The package delivery system according to claim 9, wherein the user interface further comprises at least one of a door button, keypad and a motion sensor configured to confirm the presence of the local deliverer at the door.

11. The package delivery system according to claim 1, wherein the sensing unit, coupled to the controller, further includes a pressure sensor configured to generate pressure signals to the controller with respect to a closing force of the door access panel to aid in capture of an unauthorized intruder within the passageway.

12. The package delivery system according to claim 1, wherein the sensing unit, coupled to the controller, further includes a passageway sensor configured to generate passage signals to the controller with respect to a passage of an object through the passageway while the door access panel is in the open position.

13. A package delivery system comprising:

a door access panel configured as a wicket to provide selective access to a passageway adjacent to, or within, an entry door, and being moveable between an open position and a closed position;

an actuator coupled to the door access panel;

a motor coupled to the actuator and configured to impart motion to the door access panel via the actuator;

a controller, coupled to the motor, and configured to control selective actuation of the door access panel via the motor and actuator;

a wireless communication interface, coupled to the controller, and configured to communicatively couple the controller and a smart device of an authorized user for receiving a remote input to actuate, via the motor and actuator, the door access panel to move between the closed position and the open position;

a user interface, coupled to the controller, and configured to receive local input for actuation of the door access panel to move between the closed position and the open position;

a sensing unit, coupled to the controller, and including a door access panel position sensor configured to transmit position signals to the smart device of an authorized user regarding the position of the door access panel via the wireless communication interface; and a power source configured to provide power to the controller and the motor.

14. The package delivery system according to claim 13, further comprising a scanning unit, coupled to the controller, and including package parameter detectors that are configured to determine package parameters of package delivered through the passageway including at least one of package contents, dimensions, quantities, temperature, warnings, and sender information.

15. The package delivery system according to claim 13, wherein the actuator comprises at least one of a gear, chain, cable, screw, lever and belt to transfer motive power between the motor and the door access panel to variably move the door access panel between the open position and the closed position.

16. The package delivery system according to claim 13, wherein the wireless communication interface comprises a transceiver and an antenna configured to communicatively couple the controller to at least one of the smart device and a local network.

17. The package delivery system according to claim 13, wherein the user interface comprises at least one of a Bluetooth communication device, a near-field communication (NFC) device, a touchscreen, and a keypad to receive an authorization code as the local input for actuation of the door access panel to move between the closed position and the open position.

18. The package delivery system according to claim 13, wherein the user interface comprises a camera, microphone and speaker configured for visual and audio communication between a local deliverer at the door and the smart device of the authorized user; and wherein the user interface further comprises at least one of a door button, keypad and a motion sensor configured to confirm the presence of the local deliverer at the door.

19. The package delivery system according to claim 13, wherein the sensing unit, coupled to the controller, further includes a pressure sensor configured to generate pressure signals to the controller with respect to a closing force of the door access panel.

20. The package delivery system according to claim 13, wherein the sensing unit, coupled to the controller, further includes a passageway sensor configured to generate passage signals to the controller with respect to a passage of an object through the passageway while the door access panel is in the open position.

* * * * *